United States Patent [19]

Alexander et al.

[11] E Patent Number: Re. 33,187

[45] Reissued Date of Patent: Mar. 27, 1990

[54] STABLE STRETCHED SURFACE RECORDING MEDIUM

[75] Inventors: Jerry L. Alexander, St. Paul Park; Sankar B. Narayan, White Bear Lake; Sten R. Gerfast, Mendota Heights; Charles E. Nelson, Roseville, all of Minn.

[73] Assignee: Minnesota Mining and Manufacturing Company, St. Paul, Minn.

[21] Appl. No.: 265,906

[22] Filed: Nov. 2, 1988

Related U.S. Patent Documents

Reissue of:

[64] Patent No.: 6,235,701
Issued: Nov. 18, 1986
Appl. No.: 711,825
Filed: Mar. 14, 1985

[51] Int. Cl.[4] ..... G11B 5/82

[52] U.S. Cl. ..... 428/65; 360/135; 346/137; 369/280; 369/287; 369/288

[58] Field of Search ..... 360/135; 428/64, 65; 346/137; 369/288, 280, 287

[56] References Cited

U.S. PATENT DOCUMENTS

| | | | |
|---|---|---|---|
| 2,662,804 | 12/1953 | Hutton | 346/137 |
| 3,130,110 | 4/1964 | Schmidt | 161/42 |
| 3,212,075 | 10/1965 | Dameran | 340/174.1 |
| 3,334,193 | 8/1967 | Dow | 179/100.2 |
| 3,336,583 | 8/1967 | Comstock | 340/174.1 |
| 3,359,549 | 12/1967 | Ferrand | 340/174.1 |
| 3,373,413 | 3/1968 | Treseder | 340/174.1 |
| 3,480,964 | 11/1969 | Siler | 346/74 |
| 3,488,646 | 1/1970 | Sugaya et al. | 340/174.1 |
| 3,509,274 | 4/1970 | Kilhara | 178/6.6 |
| 3,537,083 | 10/1970 | Voth | 340/174.1 |
| 3,599,226 | 8/1971 | Lips | 346/74 |
| 3,805,292 | 4/1974 | Hashiguchi et al. | 360/135 |
| 4,275,107 | 6/1981 | Bartkus et al. | 428/220 |
| 4,317,150 | 2/1982 | Gruss et al. | 360/135 |
| 4,328,607 | 5/1982 | Denner et al. | 29/169.5 |
| 4,365,257 | 12/1982 | Gerfast | 346/135 |
| 4,557,982 | 12/1985 | Nouda et al. | 428/694 |
| 4,573,097 | 2/1986 | Pastor et al. | 360/135 |
| 4,625,384 | 12/1986 | Gerfast | 29/448 |
| 4,631,609 | 12/1986 | Erickson et al. | 360/135 |

FOREIGN PATENT DOCUMENTS

| | | |
|---|---|---|
| 0030858 | 6/1981 | European Pat. Off. . |
| 0092325 | 10/1983 | European Pat. Off. . |
| 0107421 | 5/1984 | European Pat. Off. . |
| 2342890 | 3/1974 | Fed. Rep. of Germany . |

OTHER PUBLICATIONS

Alexander, J. L., "Dimensional Track Stability Measurement Using a Standard Head", *Computer Technology Review*, Summer 1984, pp. 102–103.

Business Week, Nov. 12, 1984, p. 154.

*Primary Examiner*—Alexander S. Thomas

*Attorney, Agent, or Firm*—Donald M. Sell; Walter N. Kirn; Douglas B. Little

[57] ABSTRACT

Stretched surface recording disk (SD) 10 comprises an annular support 12 having raised annular ridges 42 and 28 at its inside and outside diameters 22 and 30 with a base portion 24 in between the two ridges, and an annular recording medium film 14 held in radial tension and stretched across the base portion by adhering the film to attachment surfaces 48 and 36 near the inside and outside diameters respectively. The SD is annealed twice [duringmanufacture] *during manufacture* to relieve stress in the stretched film 14. This annealing results in SD essentially free from track anisotropy and stress distribution anisotropy in the plane of the disk. As a result, data tracks are more stable than in previous SD, track density can be greater, and the SD is generally more reliable.

6 Claims, 5 Drawing Sheets

STABLE STRETCHED SURFACE RECORDING MEDIUM

Matter enclosed in heavy brackets [ ] appears in the original patent but forms no part of this reissue specification; matter printed in italics indicates the additions made by reissue.

TECHNICAL FIELD

This invention relates to magnetic recording media, particularly flexible magnetic recording sheets stretched across the major surface of a disk-shaped support to provide a planar recording surface. The invention further relates to the preparation of double-sided disks with flexible magnetic recording film stretched across both sides of the plastic disk-shaped support.

BACKGROUND

Stretched surface recording disks (SD) generally consist of a rigid, circular support and a thin polymer film, having a recording layer, suitably attached to the periphery of the support. The development of SD has progressed over the years from a rather simple configuration described in U.S. Pat. No. 3,373,413 (Treseder) in which a film was stretched and clamped between two circular rings, to a dish-shaped support to which a stretched film was attached at the periphery as illustrated by U.S. Pat. No. 3,509,274. Subsequently, U.S. Pat. No. 3,537,083 introduced the concept of bonding the film at the center of the support in addition to the support periphery, and U.S. Pat. No. 3,599,226 described an SD which included two stretched film surfaces, one on either side of the support, which were attached at the periphery and near the center of the support.

SD are superior to floppy disks in that a pressure-pad is not required, and the recording surface has substantially the same overall dimensional stability as the relatively massive base to which it is attached. In addition, the SD provides a flat recording surface which may be deformed slightly to conform to a transducer head and irregularities in the surface of the head.

Although the patents described above have illustrated the general configuration and certain desirable features of SD, practical problems remain as impediments to the mass production and general acceptance of SD. These include the problems of track stability and stress relaxation of the stretched film.

Track dimensional stability is an important parameter in the design of recording media and drive systems. A change in track shape can cause a serious loss in signal-to-noise ratio or the loss of prerecorded data. it has been determined that circular data tracks originally recorded on SD became elliptical or distorted as the SD were exposed to variations in environmental conditions. This track movement was not completely reversible, i.e., the original circular configuration was not obtained when the SD were returned to original environmental conditions. Thus track density is limited by the dimensional instability or anisotropy of the tracks.

It has been found that the tension or stress present in the stretched recording sheet decreases over time even without changing environmental conditions. This is referred to as stress relaxation and can also distort the data tracks.

DISCLOSURE OF INVENTION

A means has been found for stabilizing the data tracks of an SD and for alleviating the problem of stress relaxation of the stretched recording medium film over time.

The invention is summarized as a stable stretched surface recording disk comprising:

A. an annular support having:
   1. at least one base portion between its inside and outside diameters;
   2. an outer raised annular ridge attached to and projecting from the base portion;
   3. an inner raised annular ridge attached to and projecting from the base portion and having a diameter less than that of the outer raised annular ridge; and B. an annular recording medium film held in radial tension across and out of contact with the base portion, being supported by the inner and outer raised annular ridges and adhered to the support, in which there is a substantial absence of anisotropic stress distribution in the annular recording medium film at constant conditions of temperature and humidity within the range of 10° to 60° C. and 8 to 80% relative humidity.

The term "radial tension" as used herein means tension stress pulling along all radii of the annulus of the recording medium film. This type of stress is produced by stretching the film over a circular ring or hoop. It should be noted that, while radial stress is of concern because it can cause track anisotropy, there may be other stresses in the film such as circumferential stress.

The temperature to which the SD is exposed should remain at least 10° C. below the glass transition temperature of the recording medium film.

The invention SD may also be described as being essentially without track anisotropy within the same temperature and humidity ranges stated above. As used herein, the absence of track anisotropy means having no more track anisotropy than a rigid aluminum disk, such as a Winchester disk having a magnetic layer comprising an oxide coating, of the same diameter would have under the same conditions. Track anisotropy is evidenced when data tracks deviate from their original circular shape. Aluminum recording disks are considered isotropic for purposes of this invention, and they have been found to have a track anisotropy of no more than about ±15 microinches (±0.4 micrometers).

These stable disks are made by a process which anneals the recording medium film. In general, the stretched film is subjected to an elevated temperature above its glass transition temperature, but below the glass transition temperature of the annular support to prevent warping. The following steps can be used to manufacture the SD:

1. Provide a polymeric sheet, which will be the substrate of the annular recording medium film, fixed in radial tension.
2. Anneal the polymeric sheet from step 1 at a temperature above its glass transition temperature for a sufficient time to obtain a substantially isotropic and stable stretched disk.
3. Bond the annealed sheet from step 2 to the annular support at or near both its inside and outside diameters to obtain an SD. It is very desirable for the bonds between the annular support and the annealed sheet to form a smooth seal free from bumps and loose spots. This step may involve additional stretching of the film, due to the geometry of the support.

4. Anneal the SD from step 3 at a temperature above the glass transition temperature of the annular recording medium film but below the glass transition temperature of the annular support for a sufficient time to obtain a substantially isotropic and stable SD.

Normally, the annealed material from steps 2 and 4 is allowed to cool to room temperature before further processing.

By reducing track anisotropy, more data can be stored on an SD of a given size by recording narrower data tracks, close together than was previously feasible.

DETAILED DESCRIPTION

Figure 1:
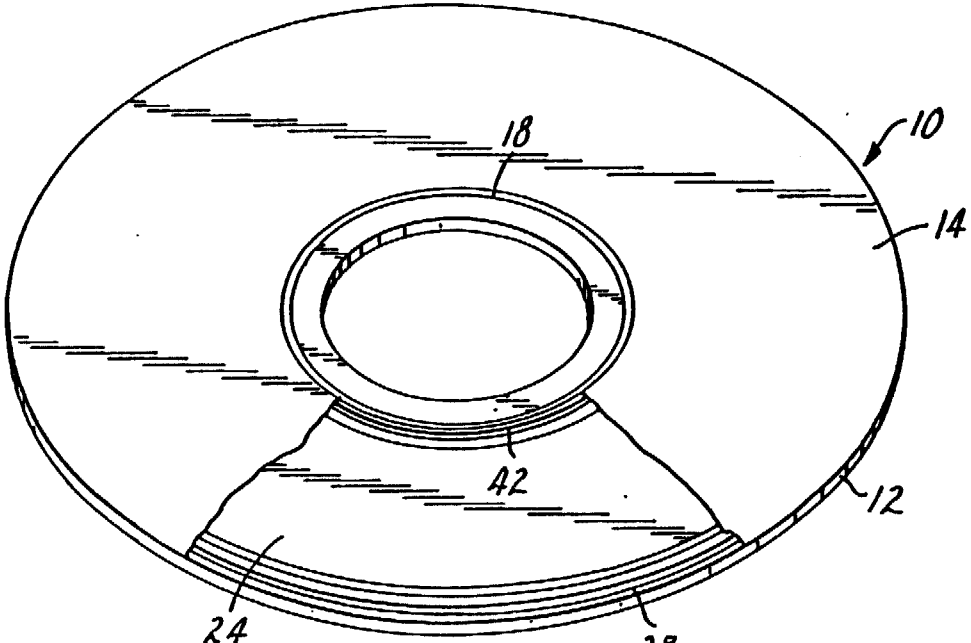
FIG. 1 is a perspective, cut-away view of an SD of this invention.
Figure 2:
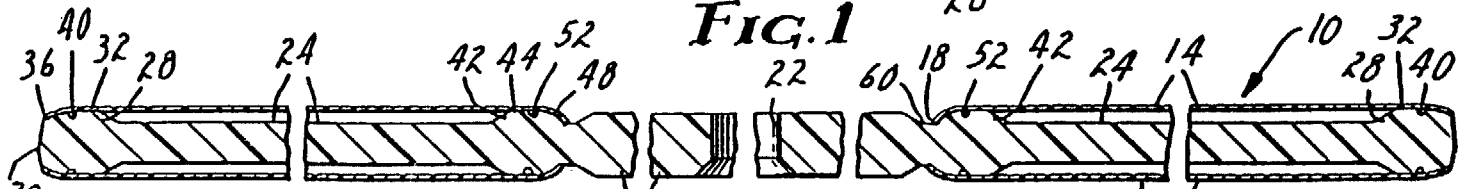
FIG. 2 is a cross-sectional view of the SD of FIG. 1.

Referring to FIGS. 1 and 2 the SD, generally indicated as 10, has annular support 12 with outer and inner raised annular ridges 28 and 42, respectively. The base portion 24 of support 12, together with such ridges, defines an annular depression in the support over which the recording medium films 14 and 16 are stretched. The annular support is made of a preferably non-magnetic material which is dimensionally stable, rigid, and has a coefficient of thermal expansion close to that of aluminum, since many drives are designed for aluminum disks.

The annular support can be made of metal such as aluminum or steel, or of thermosetting or thermoplastic resin. It is typically made of filled polymeric material such as polysulfone, polyphenylene sulfide, polyester, polyetherimide, acrylonitrile-butadiene-styrene, polystyrene, polyamide (nylon) or polycarbonate resins filled with such materials as glass beads, fiber glass and mica (e.g., 20 weight percent fiberglass and 20 weight percent mica and 60 percent polymer resin). Preferably, it is injection molded in a single cavity mold.

The base portion of the support may be a flat area joining the first and second raised annular ridges or spokes which join these ridges. The support with spokes, instead of a solid continuous base portion may be more difficult to manufacture and possibly less dimensionally stable.

The recording media films 14 and 16 can be webs of any material which is useful for recording media and which can be held in radial tension. Typically, such recording medium film would comprise a substrate on which is coated a pigment/binder recording medium, or other type of recording medium magnetizable layer such as thin metal film (e.g., cobalt/chromium).

Not only magnetic recording, but other types of recording can benefit by the induced track stability of this invention. For example, layers suitable for optical recording, such as described in U.S. Pat. No. 4,365,257, may comprise the recording layers applied to the substrate film.

The substrate should have: dimensional stability, the feasibility of being stretched, smooth surface, and the potential for being well adhered to the support material. Polyester (polyethylene terephthalate) and polyimide are possible substrate materials for magnetic media. It could be biaxially oriented polyester film or cast film. Biaxially oriented polyester is felt to have inherent anisotropy because of the stretching it undergoes during its manufacture in the machine direction (direction in which film exists the extruder) and in the transverse direction (90° to the machine direction). To minimize this anisotropy, it is preferred that the substrate for the recording media films be cut from the center of the biaxially oriented web. Other layers known to those skilled in the recording media art (e.g. subbing layers or lubricant layers) may comprise part of the recording medium film.

The bonding of the magnetic recording sheet to the support of an SD should satisfy the following criteria: a. high shear strength to withstand the tension of the stretched medium; b. minimal creep between recording medium film and support to maintain data track stability; c. smooth bonding surface to provide a smooth recording surface; and d. short setting time to allow for high production volume.

[various] *Various* means have been examined for bonding magnetic recording media film, the underside of which is typically polyethelyene terephthalate, to supports of various materials (i.e. metals, plastics, composites). Thermosetting adhesives (e.g., cyanoacrylate or epoxy adhesives) may be used but have setting or curing times which are difficult to control.

The term "adhesives" means a substrate capable of holding two bodies in intimate interfacial contact such that mechanical force can be transferred across the interface, and the term "cure" means to polymerize or cross-link into a set, rigid condition.

The preferred adhesives are acrylate and methacrylate functional adhesives (e.g. hydantoin hexacrylate) which are curable by radiation, see Komp, J. T. and Mattingly, G. S., Radiation Processing, K&M Publications, Louisville, Kentucky, 1976. Some useful classes of such radiation curable materials are: acrylated epoxy resins, acrylated bis-phenol A resins, polyester acrylate resins, acrylated urethane resins, and alkyd acrylates.

The application of electron beam radiation in conjunction with hydantoin hexacrylate has been able to meet the required conditions, actually curing the adhesive trapped within the confines of the recording medium film and the support without damaging or in any known way lessening the usefulness of the product. The bond can be fully cured with no damp, uncured or rough spots, and the recording medium film is completely sealed to the support.

The polyethylene terephthalate commonly used as a substrate for magnetic recording media has a relatively low adhesion to most adhesives which can be cured with an electron beam. One method used to overcome this is to prime the back of the polyethylene terephthalate (i.e. the side to be adhered to the support 12) with a priming solution, such as 5 to 20 percent hydantoin hexacrylate plus 0.1 to 0.4 percent Irgacure 651 photoinitiator (made by Ciba Geigy Co.) in methylethylketone or 20 to 100 percent N,N-dimethylacrylamide in methyl ethyl ketone solvent. Such primers could be coated by rotogravure technique or sprayed onto the back of the polyester film at a thickness of about 0.1 to 0.2 micrometers and cured or partially cured by ultraviolet light. The primer solution should be well mixed, and fresh primer should be prepared immediately before use.

The recording media films 14 and 16 typically have a thickness of about 5 to 200 micrometers. It is the unsupported portion of the recording media films 14 and 16 in between the two raised annular ridges which provides a deformable, resilient, annular surface used to record signals from a transducer, such as a magnetic recording head. This surface is known as the data band.

The outer raised annular ridge 28 terminates in a reference surface 32 which supports recording medium film 14 and determines the spacing between the film and the surface of the intermediate portion. Circular outer attachment surface 36 comprises a curved surface joining the outside periphery 30 of the support 12 to the outer raised annular ridge 28. Thus, its diameter is greater than that of the innermost part of the outer raised annular ridge. An adhesive groove 40 is provided in the first raised annular ridge and is provided to intercept any adhesives which may be forced from the attachment surface 36 by the film 14 and prevent such adhesive from reaching the outer reference surface 32 (possibly interfering with contact between the film and the outer reference surface).

Adjacent the inner diameter 22 of the support 12, is the second raised annular ridge 42 which, like the first raised annular ridge 28, terminates in an inner reference surface 44 spaced above the surface of the intermediate portion 24. The distance of this spacing is usually about equal to the spacing of the outer reference surface 32 above the surface of the intermediate portion. Circular inner attachment surface 48, to which the inside diameter 18 of the recording medium film 14 is adhered, comprises a curve joining relief groove 60 in the support with the inner raised annular ridge 42. Thus, its diameter is smaller than that of the outermost part of the inner raised annular ridge. Adhesive groove 52, located in the second raised annular ridge, is analogous to adhesive groove 40.

The term "outermost", as used herein, means closest to the outside diameter of the support, and the term "innermost" means closest to the inside diameter of the support.

The first and second riased annular ridges 28 and 42 could have cross sectional shapes other than those shown in FIG. 2. For example, the ridges could be triangular in cross section with a rounded apex. The apex would provide a reference surface for the recording media films 14 and 16 and a fulcrum around which the films could be drawn.

The inner and outer attachment surfaces 36 and 48 may also be coated with a primer. The following primers may be used: a 2 to 5 weight percent solution of hydantoin hexacrylate in methylethylketone with a photoinitiator, pure N,N-diamethylacrylamide, or cyanoacrylate adhesive coated onto the support and dried at room temperature. Both the hydantoin hexacrylate and dimethylacrylamide primers may be exposed to ultraviolet light.

Because the recording media films 14 and 16 are so well sealed to both the inner amd outer raised annular ridges, changes in atmospheric pressure can cause the air trapped between the support and the recording medium films to expand or contract which causes either a bulge or depression in the stretched surface of the recording media films. A small vent hole can be made in the surface of the films 14 and 16 near the inner raised annular ridge in order to equalize inside and outside air pressure.

Figure 3:
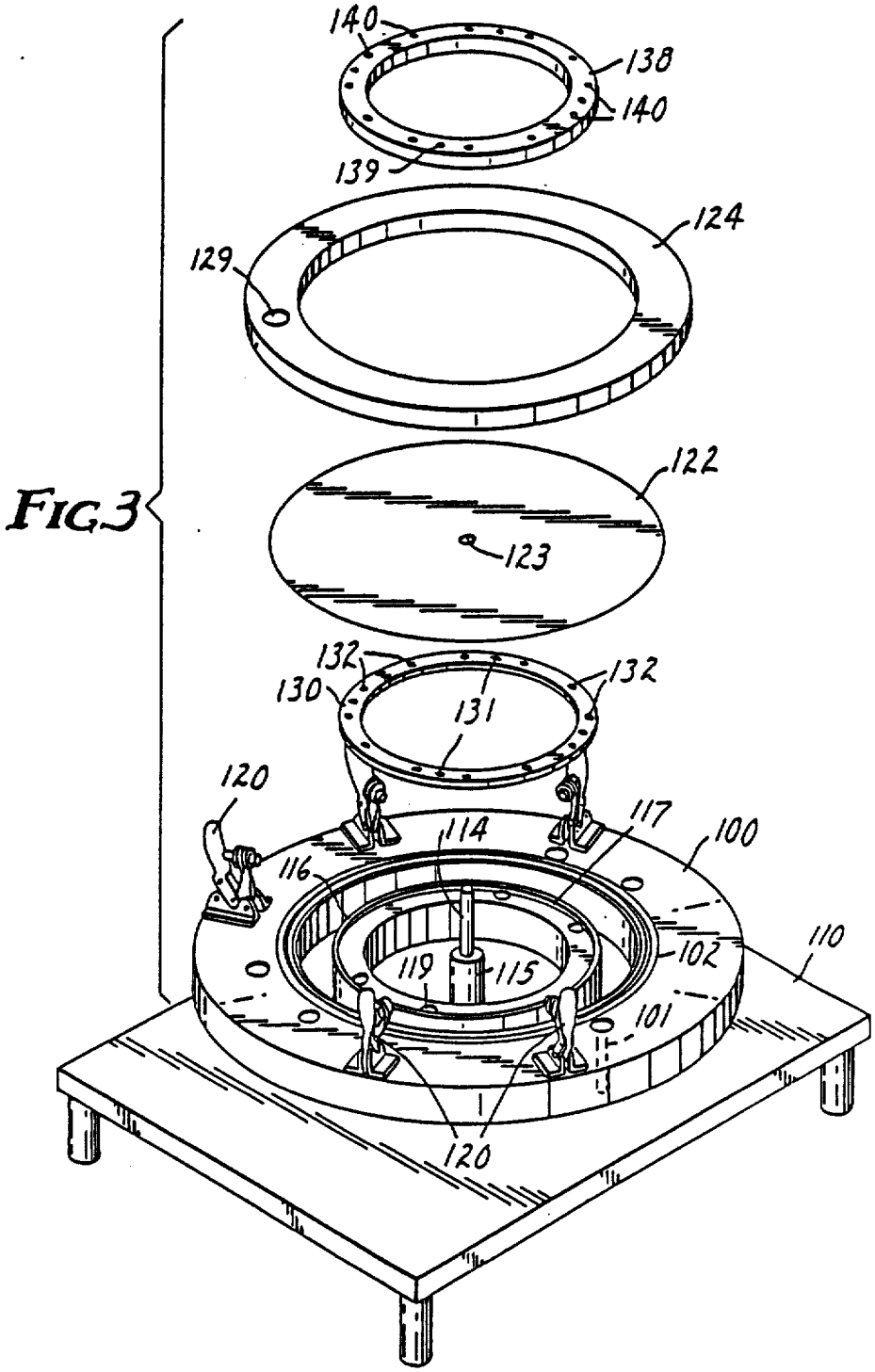
FIG. 3 is an exploded view of a stretching apparatus used for placing the recording medium film in radial tension before it is adhered to the support.
Figure 4:
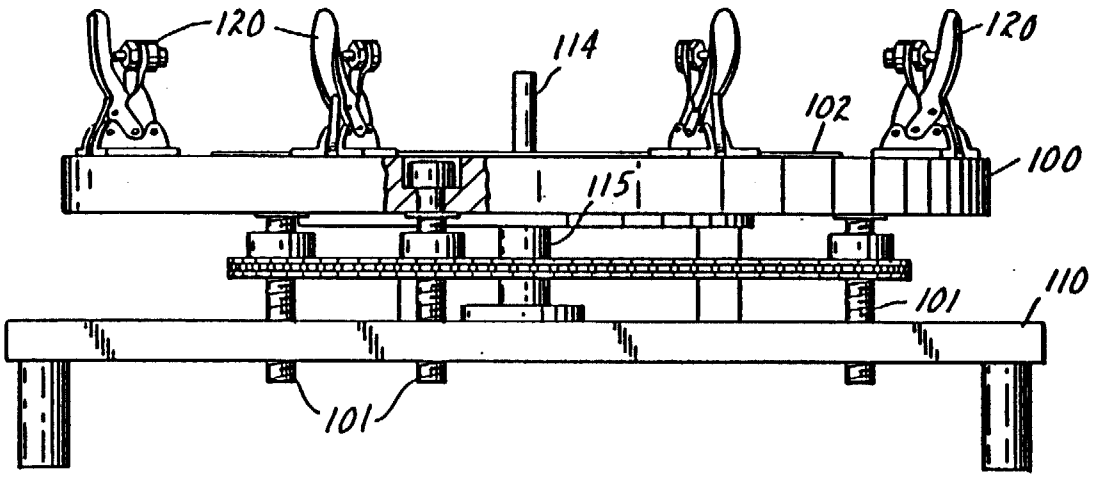
FIG. 4 is an elevation view of the stretching apparatus of FIG. 3.

The stretching apparatus, in the embodiment shown in FIGS. 3 and 4, comprises two sets of rings, one set for securely clamping a recording medium sheet 122 and the other for holding lower mounting ring 130 in place while the recording medium is stretched over it. The rings which are used for clamping the recording medium sheet are the base ring 100 and the holding ring 124. The base ring is supported upon platform 110 by rotatable base ring supports 101. Also supported upon the platform 110 are medium locator 115 and stationary ring 116 which can be conveniently supported on three or more posts from the platform. There may be locator pins (not shown) which protrude through locator holes 119 in the stationary ring and 131 in the lower mounting ring for purposes of maintaining the correct alignment of the various rings.

Lower mounting ring 130 is placed on stationary ring 116 with the locator holes 119 and 131 aligned. Ridge 117 on the stationary ring 116 helps to center the lower mounting ring 130.

The primed recording medium sheet 122 having a central hole 123 is located on top of the base ring by inserting the mdeium locator pin 114 through the hole in the recording medium sheet and laying the sheet flat. Holding ring 124 is then placed on top of the recording medium sheet, and a plurality of clamping means (such as toggle clamps) 120 are used to press the holding ring 124 tightly against the base ring 100. The base ring gasket 102 in combination with serrations (not shown) on the bottom side of the holding ring 124 help to hold the recording medium sheet tightly between the holding ring and the base ring 100.

The base ring 100 is movable upward and downward through lowering means. The lowering means may be any means known to those skilled in the art for lowering a planar device so that all points on the plane move downward at the same rate. In one embodiment, this lowering means comprises using three screws as the base ring supports 101, said screws fitting into threaded holes in the platform 110 and also having sprockets located at the same height on each screw, said sprockets being interconnected by a chain (such as roller chains known for use with chain and sprocket drives). To lower the base ring, the operator inserts a screwdriver through hole 129 in the holding ring to engage one of the three screws, and by turning the screw, he automatically turns the other two screws through the chain and sprocket mechanism lowering the base plate at an even rate. This motion stretches the recording medium sheet 122 over the lower mounting ring 130 resting on stationary ring 116.

The degree of stretching of the recording medium sheet can be controlled through the lowering means and measured by measuring the grams force needed to achieve a given amount of deformation of the stretched film, for example, grams per 25 micrometers of downward deformation of the stretched sheet. This measurement is called penetration stiffness. The penetration stiffness should be the same for both sides of a double sided SD.

Penetration stiffness is measured near the radial center of the data band portion of the stretched film using a probe with a hemispherical tip of approximately 6 mm diameter. The transducer is a linear variable differential transformer connected to a force measuring instrument. Preferably penetration stiffness is measured at several (e.g., three) equidistant points around the stretched film. For purposes of this description, anisotropic stress distribution is indicated by significant variations in penetration stiffness measured at several points equidistant from the center of the SD. A deviation of more than plus or minus 0.2 g per mil (g/25 micrometers) from the desired value would be considered significant.

The upper mounting ring 138 is placed over the stretched recording medium sheet and located by inserting the locator pins through its locator holes 139. Next, the lower and upper mounting rings are securely attached to each other by mechanical clamping means. In the embodiment shown, the mechanical clamping means comprises a number of screw holes 132 in the lower mounting ring and 140 in the upper mounting ring and screws 145 which are threaded through said screw holes (incidentally, punching holes through the recording medium sheet 122) and tightened securely. There are serrations on the mating surface of the lower mounting ring which, in conjunction with a thin rubber gasket 134 in the upper mounting ring 138, help to grip the recording medium sheet which is in radial tension. The upper and lower mounting rings 138 and 130 and mating ring 133 are usually made of stainless steel, and the rings of the stretching apparatus are typically made of aluminum.

With the recording medium sheet held securely between the upper and lower mounting rings 130 and 138, the excess recording medium sheet material beyond the outside diameter of the upper mounting ring can be trimmed away, and the mounting rings are lifted away from the stretching apparatus. The combination of the stretched recording medium held between the upper and lower mounting rings is referred to as the upper subassembly 160.

The central hole 123 should be small enough to have only negligible effect on stress distribution in the portion of the recording medium sheet which will become the data band. For SD of about 13 cm diameter, a central hole of about 6 mm diameter is suitable. It is also feasible to punch out the hole after fixing the recording medium sheet in radial tension within subassembly 160 or 170.

Figure 6:
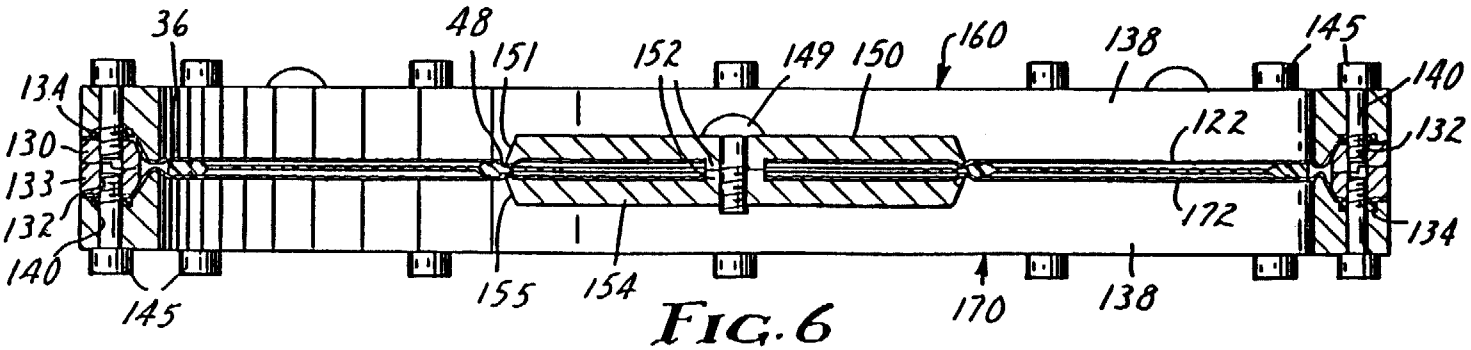
FIG. 6 is a sectional view of the stretching fixture of FIG. 5.

The lower subassembly 170 is assembled in a similar fashion except that mating ring 133 is used instead of the lower mounting ring described above. Mating ring 133 also has serrations on the surface facing the recording medium sheet 172. The sides of the lower mounting ring 130 and the mating ring 133 which are away from their respective recording media sheets are designed to mate with each other, as shown in FIG. 6, to aid in aligning the two subassemblies over the support.

The raised annular ridges of support 12 are burnished by moving circularly over an abrasive lapping film.

Ideally, the assembly steps described hereafter are done in a clean room environment in which atmospheric contaminants such as dust and other particulates are removed from the air. Operators should wear a mask and gloves.

In a typical case, a stretched recording medium sheet about 38 micrometers thick in a subassembly has a penetration stiffness of about six grams force per 25 micrometers of deformation (corresponding to about 7000 ps (48000 kPa) radial stress). The subassemblies are annealed to reduce penetration stiffness typically to about 2 grams force per 25 micrometers deformation (about 1500 psi or 10,000 kPa radial stress) for SD of 13 cm diameter. There are many annealing conditions appropriate to obtaining an isotropic stretched sheet. The conditions of time and temperature are interdependent i.e. lower temperatures requiring longer time. Two appropriate annealing conditions are: 16 hours at 66° C. and three minutes at 166° C. Both of these conditions result in a reduction in penetration stiffness by at least about 40 to 60 percent. This is called accelerated stress relaxation and helps ensure that subsequent exposure to elevated temperatures will not produce a loss in SD radial tension.

Annealing can be done in an oven, and care should be exercised to expose subassemblies to the correct conditions by using the same location within the oven consistently, placing about the same mass into the oven during each cycle, and monitoring annealing temperature with a thermocouple placed close to the subassemblies.

The support 12 is cleaned ultrasonically. Then, the adhesive (e.g. 50% hydantoin hexacrylate/50% dimethyl acrylamide) is applied in a thin layer to the inner and outer attachment surfaces 48 and 36.

Hydantoin hexacrylate, otherwise known as 1,3 Bis3[2,2,2-(triacryloyloxymethyl)ethoxy 2-hydroxy propyl]-5,5-dimethyl-2,4-imidizolidinedione has the formula

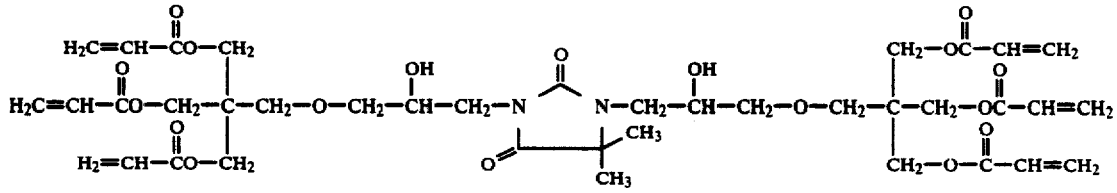

The preparation of this compound is given in U.S. Pat. No. 4,249,011. Since the viscosity of pure hydantoin hexacrylate is rather high (over about 10,000 centipoise at room temperature) the e-beam curable adhesive (e.g., hydantoin hexacrylate) may be mixed with another compound (or a minor amount of fugitive, nonreactive solvent) of lower viscosity which is compatible with the goal of adhesively bonding the recording medium film to the support. N,N-dimethylacrylamide is a suitable additive for such purposes. This material lowers the viscosity of the resulting mixture below that of pure hydantoin hexacrylate, enabling the application of a very thin, uniform film of adhesives to the bonding areas at the periphery of the annular support. A suitable adhesive mixture should have a Brookfield viscosity between about 5 and 5000 centipoise (cps) preferably between 10 and 500 cps. For N,N-dimethylacrylamide/hydantoin hexacrylate mixtures, this implies a mixture comprising about 10 to 90 weight percent hydantoin hexacrylate, the rest being N,N-dimethylacrylamide. Other compatible additives are: methacrylates such as [2(1-aziridinyl)ethylmethacrylate] *2-1-aziridinyl)ethylmethacrylate* of allyl methacrylate; acrylates such as glycidylacrylate; diacrylates such as 1,6-hexanediol diacrylate; and N-vinyl-2-pyrrolidone.

Figure 5:
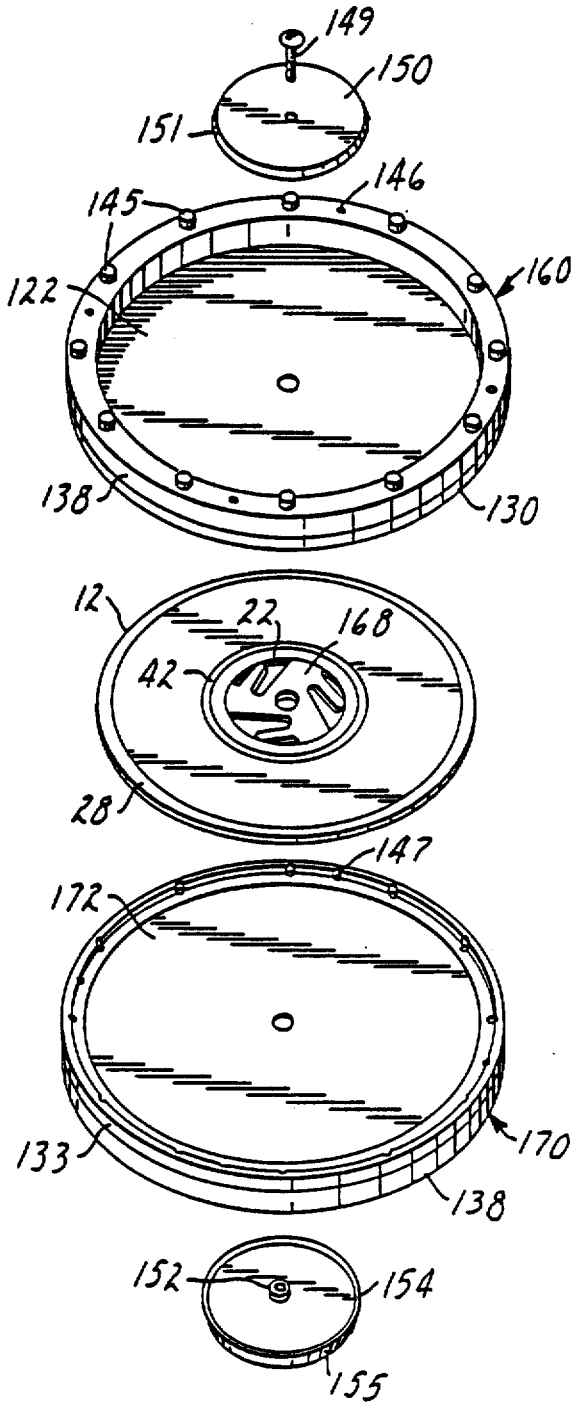
FIG. 5 is an exploded view of a stretching fixture by means of which the components of the SD are assembled.

The side of the stretched recording medium film in each subassembly which will face the support 12 is wiped with alcohol and blown clean with ionized air. Referring to FIG. 5, the lower subassembly 170 is placed on lower hub 154; the support 12 is centered on the lower subassembly; upper subassembly 160 is placed over the support and lower subassembly; and the upper hub 150 is centered on the recording medium sheet 122. The upper and lower subassemblies may be clamped together by any convenient clamping means. In the embodiment illustrated, this comprises a plurality of screw holes 146 and 147, in the upper and lower subassemblies respectively, which are threaded to receive screws (not shown) for securing the two subassemblies to each other. Screw 149 is also inserted through the central hole in hub 150 and is threaded into the central hole in the lower hub 154. The outside diameter of hubs 150 and 154 is slightly less than the diameter of the inner attachment surface 48, and as the central screw 49 is tightened, the edges of the hubs are drawn into relief groove 60, consequently forcing the recording media sheets 122 and 172 into close contact with the inner attachment surface.

It has been found helpful to place a temporary insert disk 168 fitting snugly within the inside diameter 22 of the support before it is placed in between the two subassemblies. Such a temporary insert would have a central hole with a diameter just slightly larger than the diameter of central collars 152 on the hubs, so that the hubs 150 and 154 would be located exactly at the center. This temporary insert would be removed later after the electron beam process.

The adhesive in the completely asembled SD stretching fixture shown in FIG. 6 is then cured, e.g. by exposure to an electron beam (e-beam). One e-beam apparatus useful for this step is an Electro-Curtain ® machine manufactured by Energy Sciences Inc. in Woburn, Mass. The SD stretching fixture is placed on a conveyor belt which in turn travels through the electron beam apparatus. The electron beam curing chamber is preferably maintained in an inert atmosphers (e.g. flushed with nitrogen) having less than 60 ppm oxygen. The e-beam apparatus is typically operated at 175 kv and a current of 6.7 mA when conveying speed is about 12 meters per minute or about 3.3 milliamperes when the conveying speed through the curing chamber is about 6 meters per minute. The intensity of each exposure of the SD stretching fixture to an electron beam is no more than about 10 MRad. After the SD stretching fixture has been exposed to the electron beam on one side, it is exposed in a similar manner on the opposite side for double-sided SD.

For purposes of the e-beam process, hubs 150 and 154 have bevels, 151 and 155 respectively, to ensure that the inner attachment surface 48 is actually exposed to the electron beam. As can be seen from FIG. 6, the outer attachment surface 36 is also left accessible to the electron beam, since the upper and lower subassemblies 160 and 170 actually have inside diameters larger than that of the outer attachment surface 36. The electron beam can penetrate the polymeric material as well as the magnetic layer (e.g., iron oxide pigment/binder or CoCr thin metal layer) of the recording media sheets 122 and 172, but it cannot penetrate the metal of the subassemblies or hub. Thus, it is important that the bond areas not be obstructed by metal.

After e-beam curing on both sides of the SD, the hubs 150 and 154 can be removed by removing the screw 149. Then, the portions of recording media sheets 122 and 172 in the center can be removed by curing it out, being careful not to cut into the inner attachment surface 48. Excess adhesive should be wiped off the support with cotton and alcohol; and the fixture may be exposed again to the e-beam on both sides to cure any remaining excess adhesive exposed after removal of the hubs. The purpose of wiping the adhesive from the support is to avoid the presence of cured adhesive on the inside diameter portion of the support, the area which would be clamped onto a drive hub. Dried adhesive on that area can adversely affect operation of the SD.

The upper and lower subassemblies 160 and 170 can be disassembled, and any excess recording media film beyond the outside diameter of the SD support can be cut away.

The stretched film may have experienced an increase in penetration stiffness over that which it had after the first annealing step, previously described. This added stress is relieved by a second annealing of the assembled SD, which can also be carried out in an oven so that the finished SD will be isotropic and will not experience any further stress relaxation under expected environmental conditions over time. It is desirable not to affect the stiffness of the support; so, the annealing temperature should be well below the glass transition temperature of any polymeric support material.

It has been found useful to use a temperature dampening chamber within the annealing oven. One version of this chamber consists essentially of a cylindrical metal can, larger in diameter than the SD, mounted horizontally within the middle of the oven and having a central shaft for holding the SD. The central shaft has an insulating portion (e.g., wood), and the SD being annealed are placed in the chamber by sliding the central hole of the SD over the central shaft, allowing the SD inside diameter 22 to rest on the insulating portion of the shaft. This technique helps to ensure consistent annealing conditions. Temperature within the temperature dampening chamber is monitored by a thermocouple.

One suitable annealing condition for SD with a polyetherimide support and polyester stretched recording medium film is four minutes at 93° C. This brings penetration stiffness down from about 3.2 g/25 micrometers (about 4500 psi or 31,000 kPa radial stress) to about 2.5 g/25 micrometers deformation (about 2000 psi or 14000 kPa radial stress) without warping the support. Annealing at 66° C. for 36 hours also works but is less desirable because of the length of time involved. Temperatures substantially higher than 93° C. can cause too much of a decrease in penetration stiffness, rendering SD useless for flying head applications. Final penetration stiffness is preferably greater than 1.6 g/25 micrometers deformation.

A procedure for measuring track stability is taught in Alexander, J. L. "Dimensional Track Stability Measurement Using a Standard Head", Computer Technology Review, Summer, 1984, pp. 102–103. For SD, a flying head is used to record a few concentric sets of tracks on the medium at different frequencies. For example, one track at 600 KHz is recorded adjacent a 900 KHz track, each such set of tracks being separated by an erased area. The head is moved across each set of tracks in small precise steps, as the SD is rotated, and the signal amplitude is measured at each position. The read head is then located between two of the tracks at a point where the signal amplitude from both frequencies is the same. At this centered position, the signal amplitude of each frequency is measured at 45° intervals around the disk. With low amplitude modulation, these measurements produce a circle when plotted on polar coordinates. Then, environmental conditions are changed, and the same readings are taken. Changes in track shape are detected by changes in the relative strengths of the two read signals. Track anisotropy data are reported as microinches or micrometers of deviation of tracks from their original circular path, as conditions change.

To measure the track anisotropy of an optical (nonmagnetic) SD, one track may be recorded, environmental conditions changed, and the track can be read. Because optical tracks have sufficient resolution for accurate reading (e.g. 1 micrometer bits) and optical disk drives have a servo mechanism driving the read head, the deviation of a track from the original circular path can be detected by observing the movement of the servo mechanism. Alternatively, the previously described two track method can be used.

To be considered stable, an SD should be able to maintain track stability with changes in temperature and humidity. A draft standard of the Americam National Standards Institute (ANSI)(no. X3B7/1982-76) on storage disks states operating environments of 10° to 57° C. at 8 to 80 percent relative humidity, wet bulb temperature not to exceed 26° C. Condensation on the SD should not be allowed.

SD which were bonded to their supports only at the outside diameter and which has not been annealed have been tested for track anistoropy. Also, the polyester from which their recording media films were made had been cut from the edge region of a biaxially oriented film and not the preferred center region. These SD were first brought to equilibrium at 15° C. and about 20% relative humidity, and the sets of concentric data tracks were recorded. Then, they were exposed to and equilibrated at various conditions within the ANSI specification for two to four after which measurements were again made. Track anisotropies were measured in the range of 660 microinches (17 micrometers) to 760 microinches (19 micrometers) at 22° C. and 50% relative humidity.

Track anisotropy of the annealed SD of this invention, measured by the above-described technique, is essentially the same as aluminum rigid disks. Measured SD distortion over changes in temperature and humidity within the ANSI specification has been less than the noise level (10–15 microinches or 0.25–0.4 micrometers) in the measuring system.

The invention will be further clarified by the following example.

EXAMPLE I

Figure 7:
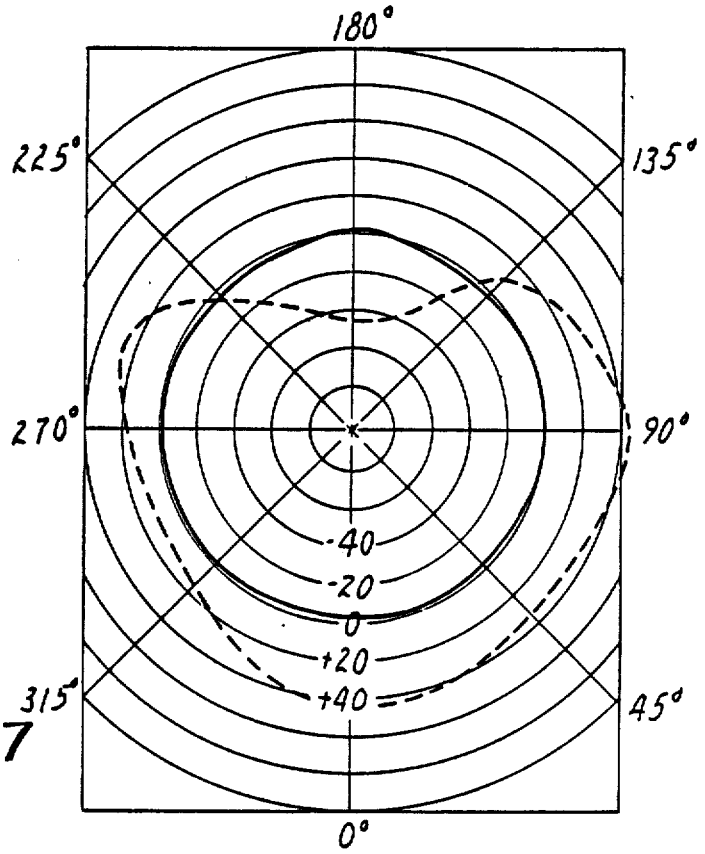
FIG. 7 is a graph of track anisotropy for two SD, one of this invention indicated by a solid line, and the other being a control sample indicated by a dashed line.

Two SD were made using the following components: recording medium film of polyester having a pigment-/binder type magnetic layer; injection molded polyether imide annular support; and adhesive made of a mixture of hydantoin hexacryalte and N,N-dimethylacrylamide. They were made by processes which were the same in all respects, except that SD1 (solid line in FIG. 7) was treated by the annealing steps described earlier (both annealing of the stretched polymeric sheet and of the bonded SD), while SD2 (dashed line) was not annealed. Each SD was held at 15° C. and 20% relative humidity for two hours after which the concentric tracks were recorded at about the middle of the data band. The environment was changed to 57° C. and 20% relative humidity for 8 hours; then the temperature was returned to 15° at 20% relative humidity and held at that condition for two hours. The SD were then tested for irreversible track anisotropy and the results were plotted on polar coordinates and are shown in the graph of FIG. 7. The numbers −40 to 40 indicate deviation from the circular datum track in microinches. The solid curve for the inventive SD1 shows essentially no track anisotropy (about 0–15 microinches, 0.4 micrometers peak-to-peak); whereas, the dashed curve of the control sample SD2 exhibits marked anisotropy (about 72–102 microinches, 2–3 micrometers, peak-to-peak).

The annular, stretched recording medium film should also maintain a relatively constant radial tension over time. Any relaxation in the film can affect track stability and the relationship between a record or read head or transducer and the medium. The extent of any stress relaxation can be detected by measuring penetration stiffness of aged SD. If penetration changes unevenly around the SD with the passage of time, the stress distribution around the disk has become anisotropic.

Figure 8:
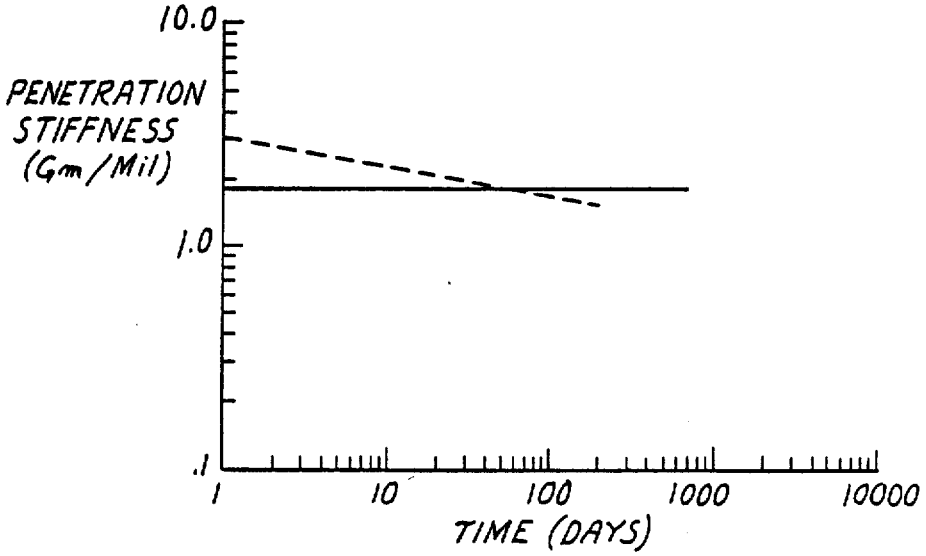
FIG. 8 is a graph of penetration stiffness of two SD vs. time in days.

The horizontal solid line in FIG. 8 represents the constant penetration stiffness and the absence of stress relaxation in one of the inventive SD held over 600 days (at 66° C. and 17% relative humidity). Penetration stiffness, and thus radial tension, did not decrease appreciably (no more than 5%) over the period of the test. The dashed, slanted line shows the decline in penetration stiffness of an SD which had not been annealed, over 100 days under the same conditions. Significant stress relaxation had occured after 10 days.

Test of tracks position repeadability (i.e., constant location of a track after repeated traversals by a head) using an interferometer have shown that the inventive SD have track repeatability similar to that of rigid aluminum disks with an oxide magnetic layer.

Other embodiments of this invention will be apparent to those skilled in the art from a consideration of this specification or practice of the invention disclosed herein. Various omissions, modifications and changes to the principles described herein may be made by one skilled in the art without departing from the true scope and spirit of the invention which is indicated by the following claims.

What is claimed is:

1. A stretched surface recording disk comprising:

(A) an annular support having (1) at least one base portion between its inside and outside diameters;

(2) an outer raised annular ridge attached to and projecting from the base portion;

(3) at least one circular outer attachment surface having a diameter greater than that of the innermost part of the outer raised annular ridge;

(4) an inner raised annular ridge attached to and projecting from the base portion and having a diameter less than that of the outer raised annular ridge; and (5) a circular inner attachment surface having a diameter smaller than that of the outermost part of the inner raised annular ridge; and (B) an annular recording medium film concentric with the annular support held in radial tension across and out of contact with the base portion, being supported by the inner and outer raised annular ridges and adhered to the inner and outer attachment surfaces of the support by an adhesive; in which track anisotropy measured in the annular recording medium film equilibrated at any condition of temperature and humidity within the range of 10° to 60° C. and 8 to 80% relative humidity is [no more] *less* than plus or minus [0.4] *2* micrometers.

2. The stretched surface recording medium of claim 1 characterized by no more than five percent loss in radial stress over ten days at constant temperature and humidity.

3. The stretched surface recording disk of claim 1, wherein the annular support of part A comprises a polymer selected from the group consisting of polysulfone, polyphenylene sulfide, polyester, polyetherimide, acrylonitrile-butadiene-styrene, polystyrene, polyamide and polycarbonate resins.

4. The stretched surface recording disk of claim 1 wherein the annular recording medium film of part B comprises a polymer selected from the group consisting of polyester and polyimide type polymers.

5. The stretched surface recording disk of claim 4 in which the annular recording medium film is adhered to the support by an adhesive selected from the group consisting of acrylate and methacrylate functional adhesives which are curable be radiation.

6. The stretched surface recording disk of claim 1 wherein the annular support has inner and outer raised annular ridges on both sides and there are annular recording media films on both sides of the disk.

* * * * *

UNITED STATES PATENT AND TRADEMARK OFFICE

CERTIFICATE OF CORRECTION

PATENT NO. : Re. 33,187

DATED : March 27, 1990

INVENTOR(S) : Alexander et al.

It is certified that error appears in the above-identified patent and that said Letters Patent is hereby corrected as shown below:

First page, under "Related U.S. Patent Documents" -
Patent No.: 6,235,701 should be Patent No.: 4,623,570

First page, under "U.S. PATENT DOCUMENTS":

"Dameran" should read --Damerau--.
"Ferrand" should read --Farrand--.
"Kilhara" should read -- Kihara--.

Col. 1, line 55, "it" should read --It--.

Col. 2, line 36, "invention" should read --inventive--.

Col. 3, line 14, "close" should read --closer--.

Col. 4, line 18, "exists" should read --exits--.

Col. 4, line 41, "adhesives" should read --adhesive--.

Col. 5, line 29, "adhesives" should read --adhesive--.

Col. 5, line 53, "riased" should read --raised--.

Col. 6, line 2, "amd" should read --and--.

Col. 6, line 33, "mdeium" should read --medium--.

Col. 8, line 65, "adhesives" should read --adhesive--.

Col. 9, line 6, "2-1-" should read --2-1---.

Col. 9, line 42, "asembled" should read --assembled--.

Col. 9, line 50, "atmosphers" should read --atmosphere--.

UNITED STATES PATENT AND TRADEMARK OFFICE

CERTIFICATE OF CORRECTION

PATENT NO. : Re. 33,187

DATED : March 27, 1990

INVENTOR(S) : Alexander et al.

It is certified that error appears in the above-identified patent and that said Letters Patent is hereby corrected as shown below:

Col. 9, lines 59/60, "it is exposed" should read --it is then exposed--.

Col. 10, line 11, "curing" should read --cutting--.

Col. 11, line 33, "Americam" should read --American--.

Col. 11, line 40, "has" should read --had--.

Col. 11, line 41, "anistoropy" should read --anisotropy--.

Col. 11, line 49, "four after" should read --four hours after--.

Col. 12, line 42, "Test" should read --Tests--.
Col. 12, line 42, "tracks" should read --track--.
Col. 12, line 42, "repeadability" should read --repeatability--.

Col. 14, line 15, "be" should read --by--.

Signed and Sealed this

Twenty-fourth Day of September, 1991

*Attest:*

HARRY F. MANBECK, JR.

*Attesting Officer*

*Commissioner of Patents and Trademarks*